July 30, 1957   J. B. MADISON   2,800,771
PNEUMATIC CONTROL SYSTEM
Filed May 23, 1955
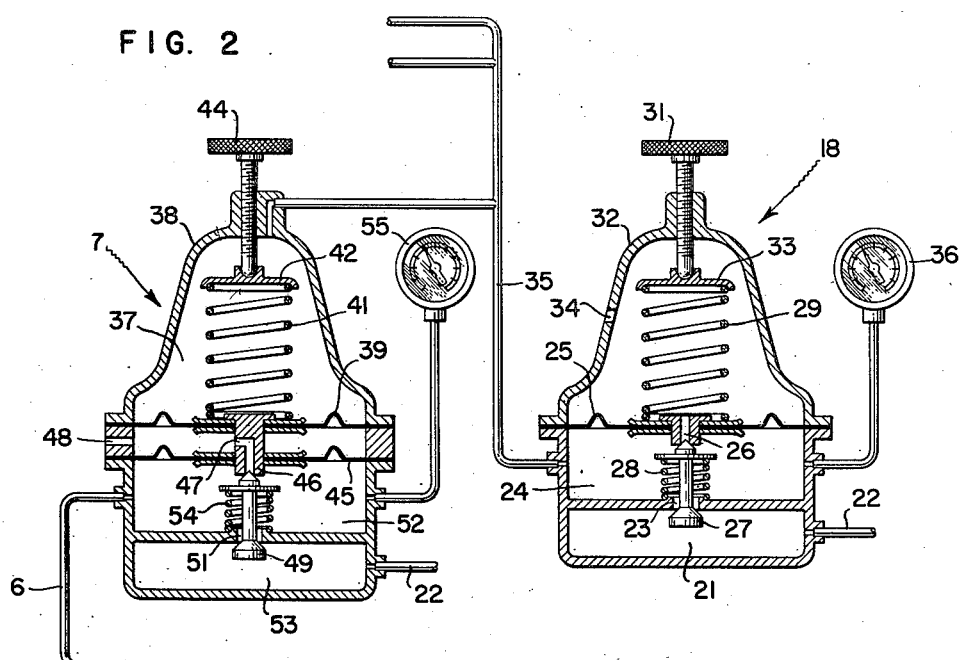
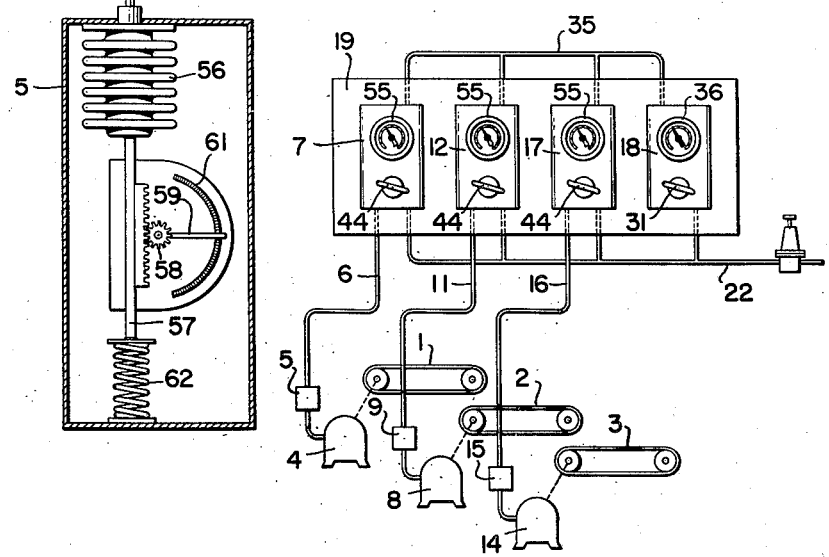
*INVENTOR.*
JAMES B. MADISON
BY
ATTORNEY.

United States Patent Office 2,800,771
Patented July 30, 1957

2,800,771

PNEUMATIC CONTROL SYSTEM

James B. Madison, Philadelphia, Pa., assignor to Conoflow Corporation, Philadelphia, Pa., a corporation of Pennsylvania Application May 23, 1955, Serial No. 510,247

3 Claims. (Cl. 60—97)

The present invention relates to a control system, and more particularly to a control system in which a plurality of related mechanisms can be controlled in unison or individually in some predetermined relation to each other.

It is an object of the invention to drive a group of mechanisms working in unison while permitting the individual adjustment of any one of the mechanisms or the simultaneous adjustment of all of them. It is a further object of the invention to provide a simple and flexible control system for a plurality of interrelated devices.

It is a further, and more specific, object of the invention to provide a pneumatic means for adjusting, either simultaneously or individually, a plurality of drive units to form an integrated operating system.

The present invention will be described, by way of example only, as being used in connection with a plurality of related conveyor belts. In the system described it is desired to adjust the speed of one conveyor belt with respect to the speed of other belts in order to space material along the belts. When the speed of the individual belts is properly adjusted, they can be adjusted in unison to conform to varying demands on the system.

The general features of novelty which characterize the present invention are pointed out with particularity in the claims annexed to and forming a part of this specification. For a better understanding of the invention, however, its advantages, and specific objects attained with its use, reference should be had to the accompanying drawings and descriptive matter, in which I have illustrated and described a preferred embodiment of the invention.

In the drawings:

Fig. 1 is a diagrammatic view of the entire control system, and

Fig. 2 is a diagrammatic view, in section, of the operating components of a portion of the system.

Referring to Fig. 1, there is shown a plurality of conveyor belts 1, 2 and 3, each of which is adapted to be driven at a different speed that has a desired relation to the speed of the other. Belt 1 is shown herein by way of example as being driven by a variable speed motor 4, whose speed is adjusted by a pneumatically operated mechanism 5. This mechanism is supplied with a variable pneumatic pressure through a pipe 6 by a secondary controller 7. Similarly, belt 2 is driven by a variable speed motor 8 whose speed is adjusted by mechanism 9. Variable pressure is supplied to mechanism 9 through a pipe 11 from a secondary controller 12. Belt 3 is driven by a motor 14 whose speed is adjusted by mechanism 15, that is in turn operated by a variable pressure in pipe 16 that is supplied from a secondary controller 17. The various secondary controllers may have their pressure outputs adjusted manually independently of each other, or simultaneously by a primary controller 18. The various controllers of the system can conveniently be mounted on a single panel board 19.

Referring to Fig. 2, the primary controller 18 is shown in detail, and takes the form of an accurate and sensitive pressure regulator. This regulator is provided with a body having in it a chamber 21 to which air under a constant, regulated pressure is supplied by an air line 22. Chamber 21 has a port 23 leading to a second chamber 24, the pressure in which is manually adjusted. One wall of chamber 24 is formed by a diaphragm 25 having a vent opening 26 therein. The opening of ports 23 and 26 is controlled by a double ended valve 27 that is biased upwardly by a small spring 28. Valve 27 is adjusted by movements of diaphragm 25 that is moved upwardly to open port 26 by pressure in chamber 24 and downwardly to open port 23 by the force of a spring 29, the lower end of which bears against a seat on its upper surface. The force that spring 29 exerts upon the upper surface of diaphragm 25, and therefore the pressure in chamber 24, is annually adjusted by a knob 31. This knob is provided with a stem that is threaded into a bonnet 32 of controller 18. The lower end of the stem bears against a movable spring seat 33 that receives the upper end of spring 29.

In operation, the output pressure of controller 18, which is the pressure in chamber 24, is varied by rotating knob 31. If the knob is rotated in a direction to increase the compression of spring 29, diaphragm 25 will be moved downwardly, thus causing valve 27 to open port 23. The pressure in chamber 24 will therefore increase until it is sufficient to move diaphragm 25 upwardly until port 23 is again closed. If knob 31 is rotated in a direction to reduce the compression on spring 29, diaphragm 25 will be moved upwardly by the pressure in chamber 24 to lift port 26 away from the upper end of valve 27. The pressure in chamber 24 will then be reduced by the exhaust of air through port 26, and a port 34 in bonnet 32, until the force of the spring is equal to that on the lower side of the diaphragm.

The pressure in chamber 24 of primary controller 18 is applied through a pipe 35 to each of the secondary controllers. This pressure is indicated on a gauge 36 that may be calibrated in some convenient variable relating to the process.

Each of the secondary controllers 7, 12 and 17 is similar, and may take the form shown in Fig. 2, for example. Pressure in pipe 35 is applied to secondary controller 7 in a chamber 37 formed between the bonnet 38 of the controller and a diaphragm 39. The force applied to the upper surface of this diaphragm is also varied by a spring 41 whose lower end rests on a seat on the diaphragm, and whose upper end engages a seat 42. The compression of the spring is adjusted by means of a stem on a knob 44, the stem being in threaded engagement with bonnet 38.

The movements of diaphragm 39 are imparted to a second diaphragm 45 to which it is rigidly attached at its center by a connection 46. This connecting member is provided with a passage 47 extending from below diaphragm 45 to the space between the diaphragms, which is vented to the atmosphere through a port 48.

Movement of diaphragms 39 and 45 actuates a double valve 49 the upper end of which controls the opening of passage 47 and the lower end of which controls the opening of a port 51 between chambers 52 and 53 in the lower portion of controller 7. Valve 49 is biased upwardly to close port 51 by a spring 54, and is moved downwardly to close passage 47 and open port 51 by a downward movement of the diaphragms. Chamber 53 is connected by an extension of pipe 22 to a regulated and constant supply of air under pressure. Chamber 52 is connected by the pipe 6 with change speed mechanism 5. Chamber 52 is also connected with a pressure gauge 55 which, in this case, may well be calibrated in terms of speed of the belt 1.

As is shown in Fig. 2, by way of example, mechanism 5 includes a bellows 56 to the interior of which the pressure in chamber 52 is applied. As the bellows changes in length a rack 57 connected thereto is moved axially to rotate a pinion 58 that has a contact arm 59 attached thereto. This contact moves over a resistance 61 in the circuit of drive motor 4 to vary the speed of that motor. Normally rack 57 is biased upwardly against the bellows by a spring 62. The other mechanisms 9 and 15 can take the same form as that of mechanism 5.

In the operation of the system, knobs 44 of the secondary controllers 7, 12 and 17 are adjusted so that the pressure output of these controllers is sufficient to give the proper relative adjustments to the speed controllers 5, 9 and 15 respectively. For example, controller 9 will be adjusted so that conveyor belt 2 is driven half again as fast as conveyor belt 1, and controller 15 is adjusted so that conveyor belt 3 is driven half again as fast as conveyor belt 2. Thus material deposited on belt 1 will be spread out as it reaches belt 2. The speed of belt 3 being greater than that of belt 2, will spread out the material even more. This is a desirable type of operation for some processes.

After the secondary controllers have been adjusted the relative speeds of the apparatus operated thereby will remain the same. Adjustment of the control knob 31 of the primary controller 18 will vary the output pressure of that instrument, which pressure is applied simultaneously to the bonnet of each of the secondary controllers. This pressure acting on the upper diaphragm 39 of the secondary controllers will produce equal adjustments of the output of each of the secondary controllers.

Thus after the secondary controllers have been adjusted to give the proper relative speeds of the final drive mechanisms, they can be simultaneously adjusted to vary the speeds thereof without changing their relation to each other. At any time that it is necessary, however, any secondary controller can be adjusted to change this relation.

The above description has been given using variable speed motors and conveyor belts as an example of the operation of the system. It will be apparent that other types of operating mechanisms may be used in the system instead of motors if it is so desired. It will also be apparent that other types of apparatus may be used to handle the material being worked upon than conveyor belts if it was so desired. For example, the secondary controllers may be used to predetermine the relative openings of valves that are controlling the flow of a plurality of reagents to a chemical process. Adjustment of the primary controller would then control the total volumes of the reagents in their pre-adjusted proportions.

From the above it will be seen that I have provided a control system in which a plurality of variables can be adjusted to a predetermined relation to each other. These variables can then be adjusted simultaneously in accordance with process requirements.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

I claim:
1. In a control system, the combination of a primary pneumatic control instrument operative to produce a single output control pressure, means to adjust said instrument to thereby vary said output control pressure, a plurality of secondary pneumatic control instruments each adapted to produce a secondary control pressure, pneumatically operated means and manually operated means in each of said secondary control instruments to vary individually the control pressure produced thereby, means to apply the single output control pressure produced by said primary control instrument simultaneously to the pneumatically operated means of each of said secondary control instruments, a plurality of pneumatically operated devices, and means to apply the control pressure produced by said secondary control instruments individually to said devices.

2. In a control system, a plurality of secondary pneumatic control instruments each adapted to produce a control pressure, pneumatically operated means in each instrument to vary pneumatically the control pressure produced thereby, means in each instrument to vary manually the control pressure produced thereby, a plurality of operated devices, means to apply individually the pressure produced by said instruments to said devices whereby manual or pneumatic adjustment of an instrument will alter the operation of a device connected therewith, a supply of fluid under pressure a pneumatically operated primary control instrument connected to said supply of fluid and operative to produce a single output control pressure from said supply, means to apply simultaneously said last mentioned output control pressure to each of said pneumatically operated means to adjust pneumatically the secondary control instruments, and manually operated means to adjust said primary control instrument to vary the single output pressure produced thereby.

3. In a control system, a plurality of operating elements, a pneumatically operated device connected to each element to control individually its operation, a plurality of secondary pneumatic control instruments, means to connect one of said control instruments to each device to operate the same in accordance with the adjustment of the instrument, manually operated means to adjust each control instrument, pneumatically operated means to adjust each control instrument, a supply of fluid under pressure a primary pneumatic control instrument connected to said supply of fluid and operative to produce a single variable output pressure from said supply, manually operated means to adjust said primary control instrument and thereby vary its single output pressure, and means to apply the output pressure of said primary control instrument simultaneously to the pneumatically operated means of each secondary control instrument.

References Cited in the file of this patent
UNITED STATES PATENTS

| | | |
|---|---|---|
| 1,641,628 | Fourness | Sept. 6, 1927 |
| 1,698,189 | Dunbar | Jan. 8, 1929 |
| 2,122,887 | McGrath | July 5, 1938 |
| 2,320,727 | Herman et al. | June 1, 1943 |
| 2,437,139 | Tucker | Mar. 2, 1948 |